United States Patent
Gui et al.

(10) Patent No.: US 10,858,256 B2
(45) Date of Patent: Dec. 8, 2020

(54) REDOX SORTING OF CARBON NANOTUBES

(71) Applicants: University of Southern California, Los Angeles, CA (US); Jason K. Streit, Gaithersburg, MD (US); Angela R. Hight Walker, Gaithersburg, MD (US); Ming Zheng, Gaithersburg, MD (US)

(72) Inventors: Hui Gui, Los Angeles, CA (US); Jason K. Streit, Gaithersburg, MD (US); Angela R. Hight Walker, Gaithersburg, MD (US); Chongwu Zhou, San Marino, CA (US); Ming Zheng, Rockville, MD (US)

(73) Assignees: University of Southern California, Los Angeles, CA (US); Government of the United States of America, as Represented by the Secretary of Commerce, National Institute of Standards and Technology, Gaithersburg, MD (US)

( * ) Notice: Subject to any disclaimer, the term of this patent is extended or adjusted under 35 U.S.C. 154(b) by 401 days.

(21) Appl. No.: 15/545,659

(22) PCT Filed: Jan. 22, 2016

(86) PCT No.: PCT/US2016/014588
§ 371 (c)(1),
(2) Date: Jul. 21, 2017

(87) PCT Pub. No.: WO2016/118898
PCT Pub. Date: Jul. 28, 2016

(65) Prior Publication Data
US 2018/0016148 A1    Jan. 18, 2018

Related U.S. Application Data

(60) Provisional application No. 62/107,190, filed on Jan. 23, 2015.

(51) Int. Cl.
*C01B 32/172* (2017.01)
*C01B 32/17* (2017.01)
(Continued)

(52) U.S. Cl.
CPC ............ *C01B 32/172* (2017.08); *C01B 32/17* (2017.08); *B82Y 30/00* (2013.01); *B82Y 40/00* (2013.01);
(Continued)

(58) Field of Classification Search
CPC ... C01B 32/172; C01B 32/17; C01B 2202/02; C01B 2202/22; B82Y 30/00; B82Y 40/00; Y10S 977/75; Y10S 977/845
See application file for complete search history.

(56) References Cited

U.S. PATENT DOCUMENTS

2006/0201880 A1    9/2006    Ziegler et al.
2008/0260616 A1    10/2008    Tour et al.
(Continued)

OTHER PUBLICATIONS

Fagan, et al., Isolation of Specific Small-Diameter Single-Wall Carbon Nanotube Species via Aqueous Two-Phase Extraction, Adv. Mater. 2014; 26: 2800-2804 with Supporting Information (Year: 2014).*

(Continued)

*Primary Examiner* — Daniel C. McCracken
(74) *Attorney, Agent, or Firm* — Fish & Richardson P.C.

(57) ABSTRACT

A method of separating and extracting carbon nanotubes, the method includes introducing the carbon nanotubes into a two-phase system that includes a first component and a second component, the first component being different from the second component. The method includes introducing a chemical agent into the two-phase system, mixing the chemical agent and the carbon nanotubes in the two-phase system, removing the first component to extract a first (Continued)

portion of the carbon nanotubes contained in the first component after the mixing, replenishing the two-phase system with fresh first component, and extracting a second portion of the carbon nanotubes contained in the fresh first component. A bandgap of the carbon nanotubes in the first portion is different from the bandgap of the carbon nanotubes in the second portion.

22 Claims, 8 Drawing Sheets

(51) Int. Cl.
*B82Y 30/00* (2011.01)
*B82Y 40/00* (2011.01)

(52) U.S. Cl.
CPC ...... *C01B 2202/02* (2013.01); *C01B 2202/22* (2013.01); *Y10S 977/75* (2013.01); *Y10S 977/845* (2013.01)

(56) References Cited

U.S. PATENT DOCUMENTS

| | | |
|---|---|---|
| 2010/0111814 A1 | 5/2010 | Doorn et al. |
| 2010/0166637 A1 | 7/2010 | Ziegler |
| 2010/0176349 A1 | 7/2010 | Schmidt et al. |
| 2010/0326891 A1 | 12/2010 | Wang et al. |
| 2014/0174991 A1 | 6/2014 | Khripin et al. |

OTHER PUBLICATIONS

Ding, et al., Analytical relation of band gaps to both chirality and diameter of single-wall carbon nanotubes, Physical Review B 2002; 66: 073401-1 to 073401-4 (Year: 2002).*

Zhang, et al., Single-Step Total Fractionation of Single-Wall Carbon Nanotubes by Countercurrent Chromatography, Anal. Cham. 2014; 86: 3980-3984 (Year: 2014).*

International Application No. PCT/US2016/014588, Notification of Transmittal of the International Search Report and the Written Opinion of the International Searching Authority, dated May 16, 2016, 10 pages.

* cited by examiner

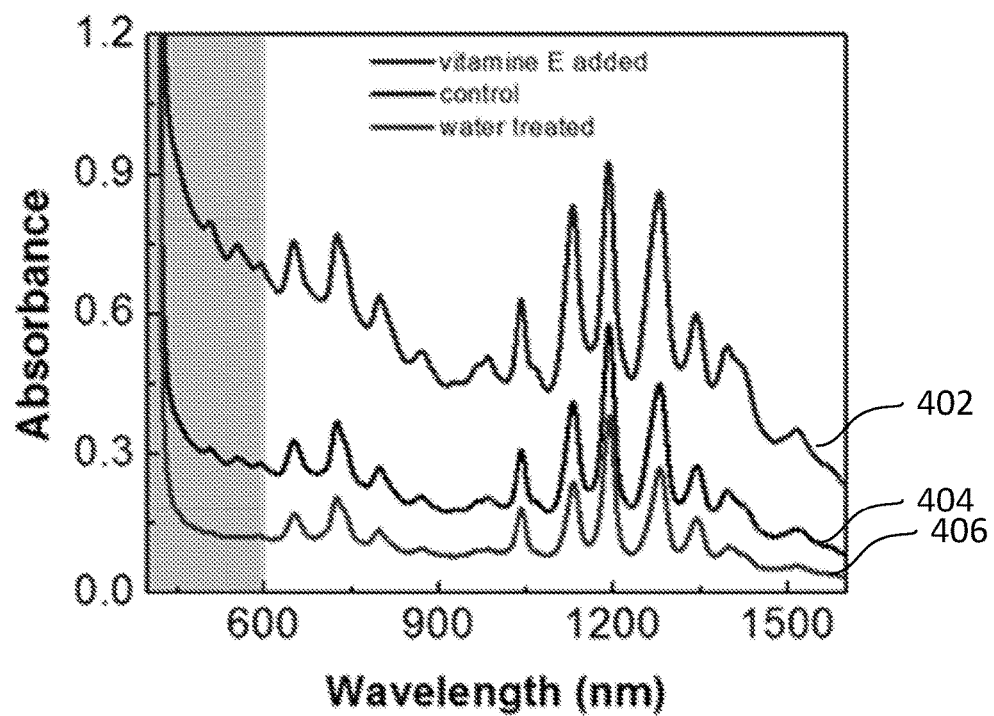
FIG. 4
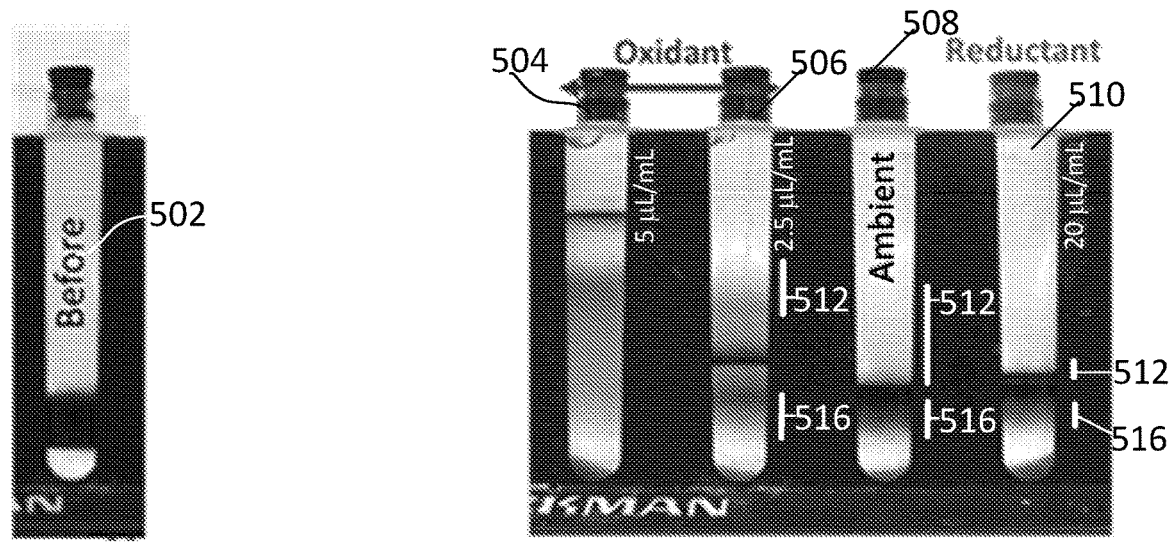
FIG. 5A
FIG. 5B 50 mM DTT control 50 mM NaClO

REDOX SORTING OF CARBON NANOTUBES

CROSS-REFERENCE TO RELATED APPLICATION

This application is a U.S. National Stage of International Application No. PCT/US2016/014588, filed on Jan. 22, 2016, which claims priority to U.S. Application Ser. No. 62/107,190 filed on Jan. 23, 2015, the content of which are incorporated herein by reference.

FEDERALLY SPONSORED RESEARCH OR DEVELOPMENT

The invention was made with government support under FA9550-14-1-0115 awarded by the Air Force Office of Scientific Research. The government has certain rights in this invention.

FIELD OF INVENTION

This disclosure relates to sorting and extraction of carbon nanotubes.

BACKGROUND

The discovery of single-wall carbon nanotubes (SWCNTs) has unveiled the existence of not just one but a family of several hundred stable macromolecules. They are simple in composition and atomic structure—all made of carbon atoms locally bonded in the hexagonal geometry of graphene, but variations in the helical twist angle ($\theta$) of the hexagons and in tube diameter (d) result in a diverse set of nanotube electronic structures. On the basis of theoretical analysis and experimental observation, SWCNTs can be ranked in an order according to the width of their electronic bandgap: armchair metallic tubes ($\theta=30°$) with zero bandgap; non-armchair semimetallic tubes with small (<100 meV) but nonvanishing bandgaps that scale as $\cos(3\theta)/d^2$; and semiconducting tubes with bandgaps that scale as $1/d$.

SUMMARY

The bandgap-based nanotube ranking manifests itself in solution phase SWCNT redox chemistry. For example, dissolved oxygen at low pH can suppress SWCNT optical absorption and resonance Raman cross-sections in a bandgap-dependent fashion: metallic tubes are more sensitive than semiconducting tubes, and among the latter, the smaller bandgap/larger diameter tubes are more sensitive than larger bandgap/smaller diameter tubes. Outer sphere electron transfer between SWCNTs and small-molecule oxidants can also exhibit the same bandgap dependence. In addition, oxygen- and pH-dependent optical response in SWCNTs may be the result of an outer-sphere electron transfer redox reaction between SWCNTs and oxygen. Thus, it can be helpful to determine the redox potential of SWCNTs and its correlation with bandgap.

The methods and systems disclosed herein expand the redox chemistry of single-wall carbon nanotubes (SWCNTs) by investigating its role in a number of SWCNT sorting processes. In exemplary embodiments that use a polyethylene glycol (PEG)/dextran (DX) aqueous two-phase (ATP) system, electron-transfer between redox molecules and SWCNTs has been observed to trigger reorganization of the surfactant coating layer, leading to strong modulation of nanotube partition in the two phases. Nanotube partition refers to the distribution of nanotubes into the two phases. While the DX phase is thermodynamically more favored by an oxidized SWCNT mixture, the mildly reducing PEG phase is able to recover SWCNTs from oxidation and extract them successively from the DX phase. The extraction order follows SWCNT bandgap: semiconducting nanotubes of larger bandgap can be extracted first, followed by semiconducting nanotubes of smaller bandgap, then non-armchair metallic tubes of small but nonvanishing bandgap, and finally armchair metallic nanotubes of zero bandgap. Redox-induced surfactant reorganization also affects nanotube buoyancy in a density gradient field, in addition to affecting their affinity to polymer matrices, and solubility in organic solvents. The methods and systems disclosed herein show that redox modulation of surfactant coating structures can be a general mechanism for tuning a diverse range of SWCNT sorting processes.

Ligand modulation of redox potential and ligand reorganization upon electron transfer occur in coordination complexes of transition metal ions. A dispersed SWCNT, i.e., a SWCNT that is stabilized by surfactants to stay in solution, can also be viewed as a coordination complex. As a result, coupling (e.g., interactions) is expected between the nanotube and the coordinating surfactant layer in electron transfer reactions.

The methods and systems disclosed herein expand the redox chemistry of SWCNTs and harness the effects of electron transfer on surfactant coating structures to effect various SWCNT separation processes.

In one aspect, a method of separating and extracting carbon nanotubes, the method includes introducing the carbon nanotubes into a two-phase system can include a first component and a second component, the first component being different from the second component. The method includes introducing a chemical agent into the two-phase system, mixing the chemical agent and the carbon nanotubes in the two-phase system, settling the two-phase system, removing the first component to extract a first portion of the carbon nanotubes contained in the first component after the mixing, replenishing the two-phase system with fresh first component. The method includes mixing the carbon nanotubes in the two-phase system having the fresh first component, settling the two-phase system, and removing the fresh first component to extract a second portion of the carbon nanotubes contained in the fresh first component. A bandgap of the carbon nanotubes in the first portion is different from the bandgap of the carbon nanotubes in the second portion.

Implementations can include one or more of the following features. The chemical agent can include an oxidant, the first component can include polyethylene glycol (PEG), the second component can include dextran, and the bandgap of the carbon nanotubes in the first portion is larger than the bandgap of the carbon nanotubes in the second portion. The two-phase system can include 6% PEG and 6% dextran. The oxidant includes NaClO.

The method can include introducing surfactants to the first component and the second component. The chemical agent can cause electrons to transfer between the carbon nanotubes and the chemical agent. The method can include reorganizing a surfactant coating layer surrounding the carbon nanotubes; and altering a partition of the carbon nanotubes in the two-phase system. The surfactants can include sodium cholate and sodium dodecyl sulfate. A concentration of the sodium cholate can be between 0.4% to 1%, and a concentration of the sodium dodecyl sulfate can be 0.4% to 1%.

The method can be carried out at temperatures between 15° C. to 30° C. The carbon nanotubes in the first portion can include metallic tubes having a bandgap smaller than 100 meV, and the carbon nanotubes in the second portion can include metallic tubes having a bandgap smaller than that of the carbon nanotubes in the first portion. The carbon nanotubes in the first portion can include semiconducting nanotubes having a first bandgap, and the carbon nanotubes in the second portion can include semiconducting tubes having a bandgap smaller than the first bandgap.

The method can include after extracting the second portion, replenishing the two-phase system with fresh first component, adding the chemical agent into the two-phase system, mixing the chemical agent and the carbon nanotubes in the two-phase system, settling the two-phase system, removing the first component of the two-phase system to extract a third portion of carbon nanotubes contained in the first component, replenishing the two-phase system with fresh first component, mixing the carbon nanotubes in the two-phase system having the fresh first component, settling the two-phase system, removing the first component of the two-phase system to extract a fourth portion of carbon nanotubes contained in the first component of the two-phase system. The carbon nanotubes in the first portion can include semiconducting nanotubes having a first bandgap, the carbon nanotubes in the second portion can include semiconducting tubes having a bandgap smaller than the first bandgap. The carbon nanotubes in the third portion can include metallic tubes having a bandgap smaller than 100 meV, and the carbon nanotubes in the fourth portion can include metallic tubes having a bandgap smaller than that of the carbon nanotubes in the third portion. The chemical agent can include a reductant, the first component can include polyethylene glycol (PEG), the second component can include dextran, and introducing the reductant can cause semiconducting carbon nanotubes to be enriched in the dextran.

The reductant can include $NaBH_4$. The carbon nanotubes can include arc-discharge single-wall carbon nanotubes. The first component can be a top component of the two-phase system and the second component can be a bottom component of the two-phase system. The first component can be a bottom component of the two-phase system and the second component can be a top component of the two-phase system.

In another aspect, a method of separating carbon nanotubes having different bandgaps, the method includes introducing the carbon nanotubes to a two-phase system, the two-phase system can include a first component and a second component, the first component being different from the second component; and chemically altering an electronic configuration of the carbon nanotubes to alter bonding between the carbon nanotubes and surfactant molecules surrounding the carbon nanotubes. The surfactant molecules reorganize in composition and/or spatial arrangement, causing changes in solvation energies of the carbon nanotubes in the first component and the second component as a function of bandgap.

Implementations can include one or more of the following features. The first component of the two-phase system can include a stationary phase polymer matrix and the second component can include an eluent.

Chemically altering the electronic configuration can include introducing an oxidant. The reorganization of the surfactant molecules changes a binding affinity of the carbon nanotubes to the stationary phase polymer matrix. The eluent can include 1% sodium dodecyl sulfate, the oxidant can include NaClO, and carbon nanotubes collected in an earlier portion of the eluent can include metallic carbon nanotubes, and carbon nanotubes collected in a later portion of the eluent can include semiconducting carbon nanotubes.

The first component of the two-phase system can have a first density and the second component can have a second density different from the first density, and chemically altering the electronic configuration of the carbon nanotubes can include modulating a buoyancy of the carbon nanotubes as a function of bandgap.

Chemically altering an electronic configuration can include introducing an oxidant, and the oxidant can be configured to change an average density of the carbon nanotubes.

BRIEF DESCRIPTION OF DRAWINGS

FIG. 4 shows absorption spectra of HiPco SWCNT dispersions.

FIG. 5A shows a photograph of SWCNTs prior to a density gradient ultracentrifugation separation.

FIG. 5B shows a photograph of SWCNTs post the density gradient ultracentrifugation separation for a range of redox potential altering concentrations.

Like reference symbols in the various drawings indicate like elements.

DETAILED DESCRIPTION

Figure 1A:
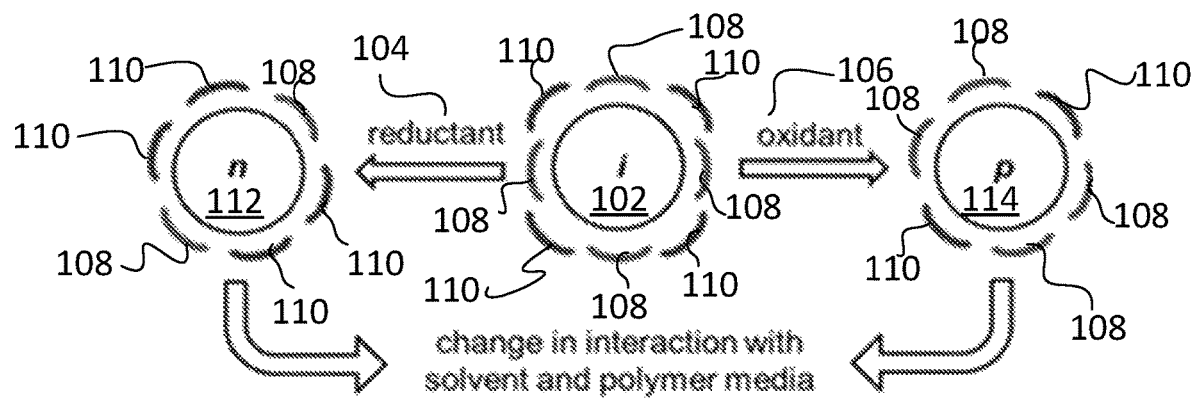
FIG. 1A shows a schematic diagram of the chemistry involved in the methods disclosed herein.

FIG. 1A shows a schematic diagram of the chemistry involved in the methods disclosed herein. Black circles 102, 112, and 114 each represents an individual nanotube. A line 108 represents a first type of surfactant molecule and a line 110 represents a second type of surfactant molecule. The surfactant molecules 108 and 110 can form a surfactant coating layer around an individual nanotube. Exemplary surfactant molecules include sodium dodecyl sulfate (SDS) and sodium cholate (SC).

The methods disclosed herein can cause electron transfer between SWCNTs and exogenous (i.e., externally added) redox molecules. The transfer of electrons induces surfactant coating layer reorganization, which in turn changes the interaction between dispersed SWCNTs and their solvent media, altering the outcome of a number of separation processes. Dispersed SWCNTs refers to SWCNTs that are stabilized by surfactant molecules, which help keep SWCTNs in solution. The oxidized, resting, and reduced states of nanotubes are denoted by p, i, and n, respectively. A resting nanotube 102, when exposed to an oxidant 106, becomes an oxidized nanotube 114. In contrast, when the resting nanotube 102 is exposed to a reductant 104, it becomes a reduced nanotube 112.

For illustration purposes, eight surfactant molecules are shown schematically arranged in an alternating pattern of surfactant molecule 108 and surfactant molecule 110 around the resting nanotube 102 in FIG. 1A. Different number of surfactant molecules (i.e., fewer than eight, or greater than eight) are possible.

After oxidation by the oxidant 106, the surfactant molecules rearrange such that only six surfactant molecules surround the oxidized carbon nanotube 114, with two surfactant molecules 110 being arranged directly opposite each other. Four surfactant molecules 108 occupy four remaining positions around the oxidized nanotube 114. The schematic diagrams are used to illustrate the reorganization of surfactant molecules, and the arrangement illustrated in FIG. 1A is simply an example of a possible arrangement.

After reduction by the reductant 104, the surfactants are rearranged such that only six surfactant molecules surround the reduced carbon nanotube 112, with two surfactant molecules 108 being arranged directly opposite each other. Four surfactant molecules 110 occupy four remaining positions around the reduced nanotube 112. In other words, the placement of the surfactant molecules 108 around the reduced nanotube 112 is the same as the placement of the surfactant molecules 110 around the oxidized nanotube 114. The arrangement of surfactant molecules depicted in FIG. 1A is only for illustrative purposes and other arrangements are possible. The changes in the arrangement of the surfactant molecules for nanotubes having different oxidation states (i.e., resting, oxidized or reduced) cause a change in the interaction of the respective carbon nanotubes with the solvent and polymer media. The polymer media can refer to, for example, the mixture of PEG, DX, surfactants and solvents. Water is an example of a solvent.

Figure 1B:
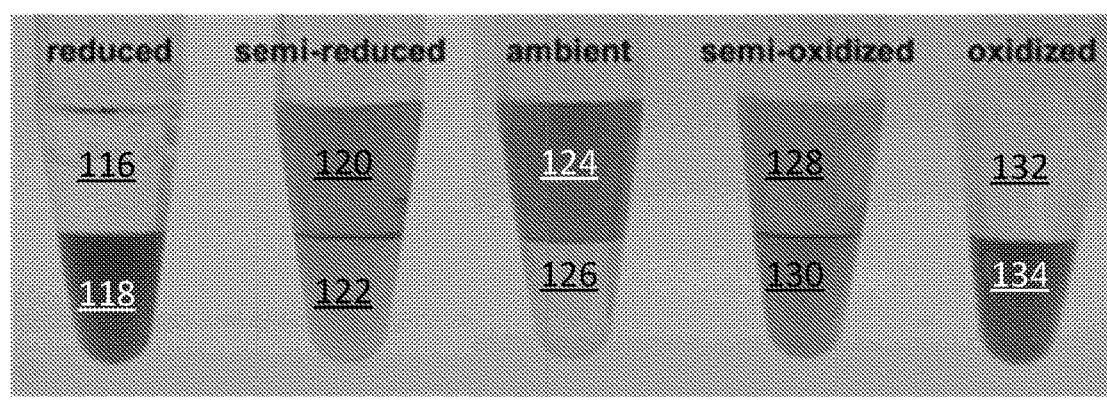
FIG. 1B shows a redox modulation of nanotube partition in a 6% PEG+6% DX two-phase system.

FIG. 1B show five distinct two-phase systems. The five systems show different redox modulation of SWCNT partition in a polyethylene glycol (PEG)/dextran (DX) system. In other words, SWCNT having different bandgaps (for example, due to their metallic or semiconducting nature) are preferentially distributed (i.e., partitioned) into the two phases (i.e., PEG or DX). Other examples of two-phase systems include PEG-polyacrylamide, and PEG-polyvinylpyrrolidone. The five different partition regimes can be created under different redox conditions: reduced, semi-reduced, ambient, semi-oxidized, and oxidized. Exemplary arc-discharge SWCNTs are used for the embodiments depicted in FIG. 1B. Similar results are also observed for nanotubes with other diameter ranges.

In the reduced regime, both metallic and semiconducting SWCNT are found in the bottom (e.g., DX) phase. In the semi-reduced regime, metallic and semiconducting SWCNT are found in top (PEG) and bottom (DX) phases, respectively. In the ambient regime, both metallic and semiconducting tubes are found in the top (PEG) phase. In the semi-oxidized regime, metallic and semiconducting tubes are found in bottom (DX) and top (PEG) phase respectively, reversing the partition found in the semi-reduced regime. In the oxidized regime, both semiconducting and metallic tubes are once again pushed to the bottom (DX) phase.

The embodiments shown in FIG. 1B use the same amount of arc-discharge SWCNTs purchased from Hanwha of Seoul, South Korea, and an identical surfactant composition 0.9% SC+0.4% SDS in all cases. As used herein, the percentages are provided as weight percentages. As shown in FIG. 1B, top component 116 forms the top phase and bottom component 118 forms the bottom phase, and both component 116 and 118 are in the reduced state. The reduced state can be, for example, obtained by adding 200 mM $NaBH_4$ to the SWCNT and surfactant mixture.

Top component 120 and bottom component 122 are in the semi-reduced state.

The semi-reduced state can be obtained by adding 70 mM $NaBH_4$ to the SWCNT and surfactant mixture.

Top component 124 and bottom component 126 are in the ambient state. No redox chemical agents are added in this case.

Top component 128 and bottom component 130 are in the semi-oxidized state. 0.5 mM NaClO can be added to the SWCNT and surfactant mixture in the semi-oxidized state.

Top component 132 and bottom component 134 are in the oxidized state. 2 mM NaClO can be added to the SWCNT and surfactant mixture to achieve the oxidized state.

Table 1 below shows the compositions of the five aqueous two phase (ATP) systems shown in FIG. 1B. The volume number unit used in the table is µL.

| | 20% DX | 50% PEG | 10% SC | 10% SDS | 2% SC dispersed HW | Redox chemicals | DI water |
|---|---|---|---|---|---|---|---|
| Reduced | 150 | 60 | 40 | 20 | 25 | 100 (1M $NaBH_4$) | 115 |
| Semi-reduced | 150 | 60 | 40 | 20 | 25 | 35 (1M $NaBH_4$) | 180 |
| Ambient | 150 | 60 | 40 | 20 | 25 | 0 | 190 |
| Semi-oxidized | 150 | 60 | 40 | 20 | 25 | 5(50 mM NaClO) | 185 |
| Oxidized | 150 | 60 | 40 | 20 | 25 | 2 (0.5M NaClO) | 188 |

40 mM DTT can be used in place of $NaBH_4$ to create the semi-reduced regime, but it is not strong enough to achieve the reduced regime. The NaClO effect can also be reproduced with approximately 250 mM $H_2O_2$, or approximately 20 mM $K_3Fe(CN)_6$, or approximately 50 µM KMnO4, or 1 µM $K_2IrCl_6$.

Figure 1C:
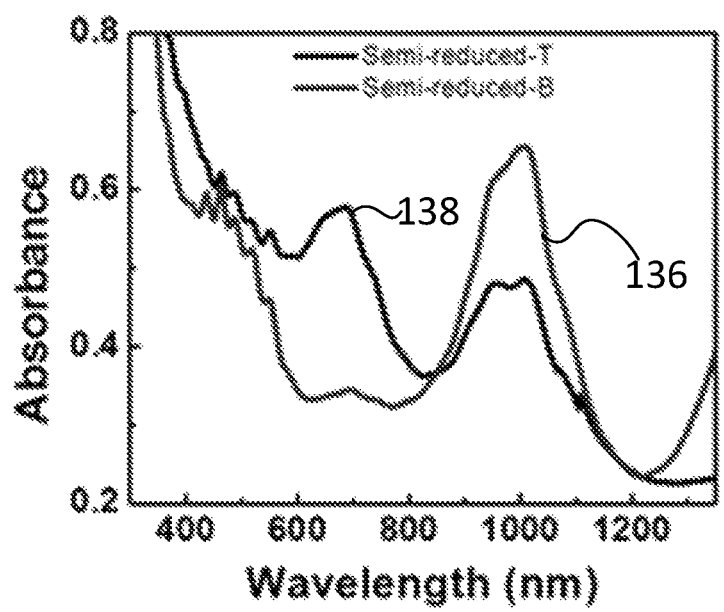
FIG. 1C shows absorption spectra of SWCNTs in a semi-reduced regime.
Figure 1D:
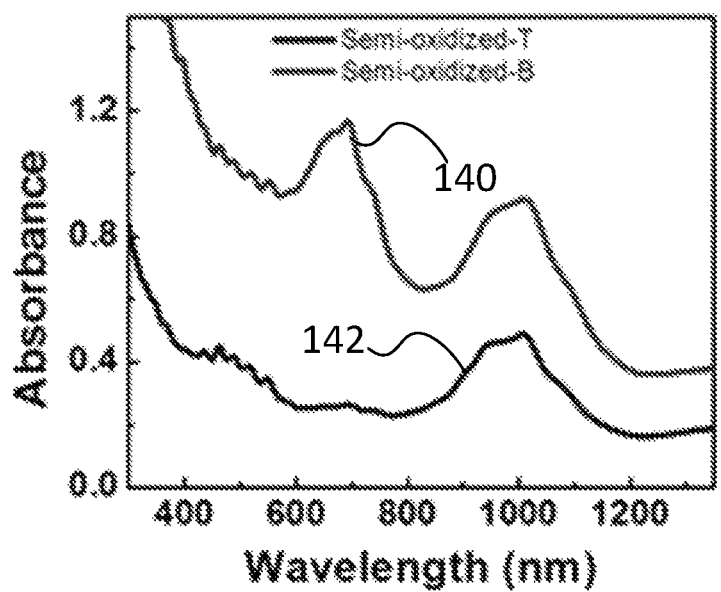
FIG. 1D shows absorption spectra of SWCNTs in a semi-oxidized regime.

A plot 138 in FIG. 1C shows the absorbance spectrum of the top component 120 in the semi-reduced regime and plot 136 shows the absorption spectrum of the bottom component 122 in the same regime. The absorption peak near ~1000 nm is a spectral signature of semiconducting SWCNTs. The absorption peaks between 600 nm-800 nm are spectral signatures of metallic SWCNTs. A plot 140 in FIG. 1D is the absorbance spectrum of the bottom component 130 in the semi-oxidized regime and plot 142 is the spectrum of the top component 128 in the same regime.

Plots 136 and 138 show that in the semi-reduced case, semiconducting SWCNTs are enriched in the bottom phase; whereas in the semi-oxidized case (plots 140 and 142), they are in the top phase. A ratio of absorption peak at 1000 nm to those between 600 nm-800 nm in the plot 142 is higher than that ratio in the plot 140, indicating that a higher percentage (i.e., enriched) of semiconducting SWCNT is present in the top phase.

Figure 2A:
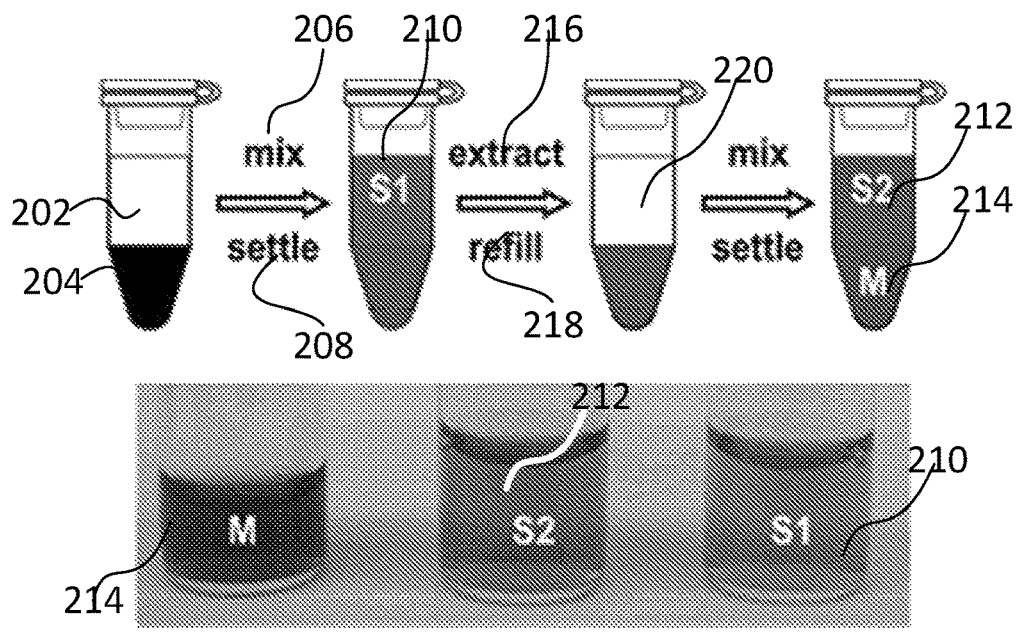
FIG. 2A shows a separation scheme for the fractionation of high pressure carbon monoxide (HiPco) nanotubes by successive oxidative extraction, and a photograph of various extracted fractions.

FIG. 2A shows a schematic of an extraction process that separates carbon nanotubes according to their bandgaps. For each separation case, all the chemicals listed in Table 1 can be added into a 1.5 mL Eppendorf tube. The top component 202 shown in FIG. 2A includes, for example, PEG, and the bottom component 204 includes, for example, DX. This is then followed by step 206 in which the contents of the Eppendorf tube are mixed by vortexing the mixture for about 15 s. After mixing in the step 206, settling occurs in a step 208 by centrifugation to settle the contents of the Eppendorf tube in a two-phase partitioning.

While both oxidants and reductants can generate partition conditions for SWCNT sorting, the oxidative process can offer partition control, that is, the control of the distributions of SWCNT in the two phases of the system. This ability may be due in part to a built-in oxidant gradient across the two polymer phases (e.g., the PEG and DX phases) caused by the mildly reducing nature of PEG.

For example, by monitoring changes in SWCNT optical absorbance induced by oxidation, 0.5-50 mM NaClO (i.e., an oxidant) were found to be consumed by 6% PEG within one minute.

In contrast, NaClO is quite stable in DX and capable of oxidizing nanotubes. When NaClO is added to a PEG/DX ATP system, PEG cannot effectively consume NaClO residing in the DX phase, unless the two phases are mixed to enhance cross-phase NaClO diffusion, (i.e., the diffusion of NaClO from the DX phase into a vicinity of PEG to be consumed by the PEG). An oxidative extraction process that makes use of this phenomenon can, for example, start as shown in FIG. 2A by pushing substantially all the SWCNT into the oxidized regime through the addition of a sufficient amount of NaClO. As shown in FIG. 2A, a component 210 or S1 and a component 212, or S2 are two successive fractions extracted into the top PEG phase from the starting materials. Nanotubes remaining in the bottom DX phase are labelled as the M fraction, or a component 214. The oxidative extraction process starts by shifting the system to a semi-oxidized regime by repeatedly mixing the ATP system to gradually reduce the oxidative effect. The repeated mixing causes the NaClO which is in the DX phase to cross-phase diffuse into a vicinity of PEG molecules, or the PEG phase. The NaClO in PEG is then consumed by the mildly reducing PEG, reducing the oxidative strength of the system and making the overall system semi-oxidized Thereafter, the top PEG phase (component 210, or S1, with the nanotubes residing therein) is removed in a step 216, and fresh top phase is added in a step 218 to reconstitute the ATP system. More fractions can be generated by repeating the mixing (step 206) and refilling (step 218), until substantially all the nanotubes in the bottom phase are extracted to the top phase.

Figure 2B:
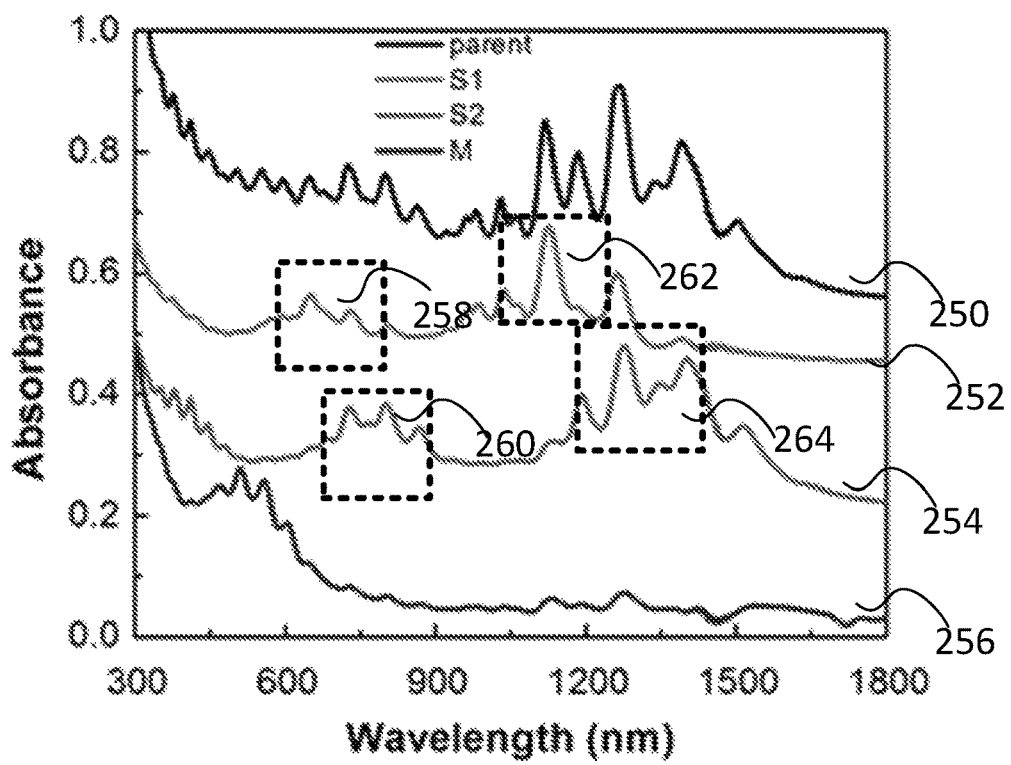
FIG. 2B shows optical absorption spectra of the parent HiPco material and fractions successively extracted from a PEG/DX ATP system.

FIG. 2B shows the result of a HiPco nanotube fractionation by such a successive extraction process using an ATP system composed of 6% PEG+6% DX and 0.9% SC+1% SDS. The ATP can also be composed of between 6%-10% PEG, and 6%-10% DX.

In the first step, 1 mM NaClO is added so that the system is pushed into the oxidized regime with substantially all the nanotubes residing in the bottom DX phase. Upon mixing and phase settling, smaller diameter/larger bandgap semiconducting tubes are extracted into the top PEG phase (fraction S1, or component 210). The top phase is then removed and replaced with a fresh PEG phase in the step 216 and 218. Upon further mixing and settling, a second fraction containing larger diameter/small bandgap semiconducting tubes is extracted (fraction S2, or the component 212).

The parent carbon nanotubes have an absorption spectrum 250, the fraction S1 has an absorption spectrum 252, the fraction S2 has an absorption spectrum 254. Remaining in the bottom DX phase are largely metallic tubes (fraction M, or the component 214) having an absorption spectrum 256, which are further fractionated by repeating the PEG phase extraction procedure, (e.g., the steps 216 and 218 to form further fractions $M_n$, where n>1 and n is the number of times the steps 217 and 218 are repeated on the fraction M). The change in bandgap of the SWCNTs in the fractions S1 and S2 is clearly indicated by the shift in E11 and E22 absorption peak towards longer wavelengths as shown in FIG. 2B. The E11 absorption peak is within the spectral range of 900-1500 nm, and the E22 absorption peak is within the spectral range of 600 nm-900 nm. The E22 absorption peaks for fraction S1 is labeled in box 258, and the E22 absorption peaks for fraction S2 is labeled in box 260. The peaks in box 260 are shifted to longer wavelength compared to the peaks in box 258. Similarly, the E11 peaks for fraction S1 is labeled in box 262, and the E11 absorption peaks for fraction S2 is labeled in box 264. The peaks in box 264 are shifted to longer wavelengths compared to the peaks in box 262.

The total volume can be set at 1.5 mL for successive extractions so that more purified materials can be obtained. An exemplary chemical composition of the ATP system is given in Table 2 below.

Table 2 shows the composition of the ATP system for NaClO aided successive extraction of HiPco nanotubes. The volume number unit used in the table is µL.

| 20% DX | 50% PEG | 10% SC | 10% SDS | 2% SC dispersed HiPco | DI water |
|---|---|---|---|---|---|
| 450 | 180 | 75 | 150 | 600 | 45 |

The composition shown in Table 2 gives a final concentration of 6% PEG, 6% DX, 0.9% SC, and 1% SDS. The HiPco (from Rice University, Houston, Tex.) dispersion used in this process is first dispersed in 2% sodium deoxycholate (SDC). It can then be purified by the vertical sorting and exchanged into 2% SC. The exchange or extraction process begins by adding all the chemicals into a 1.5 mL Eppendorf tube. This is followed by vortex-mixing for 15 s, and centrifugation for about 1 minute to have the two phases formed. Initially, substantially all the SWCNTs are found in the top phase (e.g., PEG phase). The bottom phase (e.g., the DX phase) is removed and the top phase is mixed with replaced fresh blank bottom phase. Then, the mixture can be mixed and phase-separated again. This process is repeated for 3 times to remove trace amount of SDC in the ATP system.

Then, 1 mM NaClO is added to push substantially all the SWCNTs to the bottom phase (e.g., DX phase). After vortexing and centrifugation (i.e., steps 206 and 208), the top phase is extracted in step 216 to yield fraction S1 (or the component 210). Then, equal amount of fresh blank top phase (1 mL) is added in the refill step 218, which is prepared beforehand to have the composition given in Table 2. Repeat the mixing, centrifugation, and top phase extraction step to yield fraction S2 (or component 212). After this, a fresh blank top phase (0.5 mL) is added. After mixing and centrifugation, the remaining SWCNTs is transferred (or partitioned) into the top phase from the bottom fraction M (or component 214).

Thereafter, another 1 mM NaClO is added to push nanotubes to the bottom phase. The extraction process is repeated to yield fractions $M_1$ to $M_6$. For the metallic tube extraction, 0.5 mL (compared to 1 mL) top phase is used to increase the concentration of SWCNTs in each fraction.

Figure 3A:
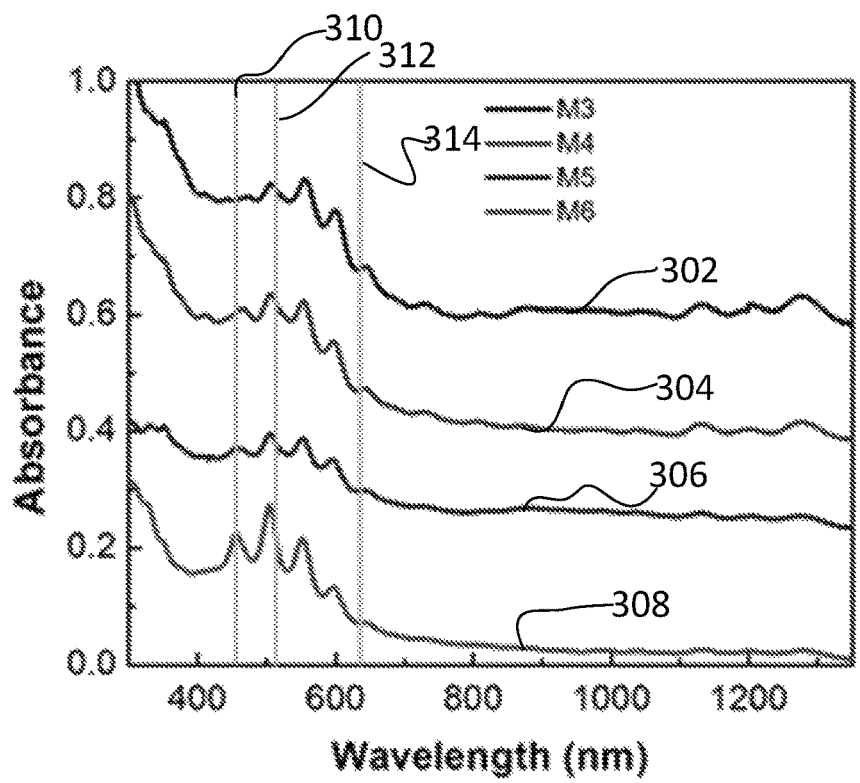
FIG. 3A shows spectroscopic characterization of fractions successively extracted from a component shown in FIG. 2A.

FIG. 3A shows the absorption spectra 302, 304, 306, and 308, of four successively extracted metallic fractions $M_3$ to $M_6$ from the M fraction. The spectrum 308 of $M_6$ closely resembles that of carbon nanotubes having armchair-enriched fractions. To determine the difference in chirality distribution in the metallic fractions, the Raman radial breathing mode (RBM) profiles of $M_3$ and $M_6$ using three different excitation wavelengths are measured. The vertical green lines 310, 312, and 314 indicate the wavelength positions of laser excitation used for the resonance Raman measurement (i.e., at excitation wavelength of 457 nm, 514 nm, and 632 nm, respectively.) The spectra can be normalized by integrating the spectral area for easy comparison.

Figure 3B:
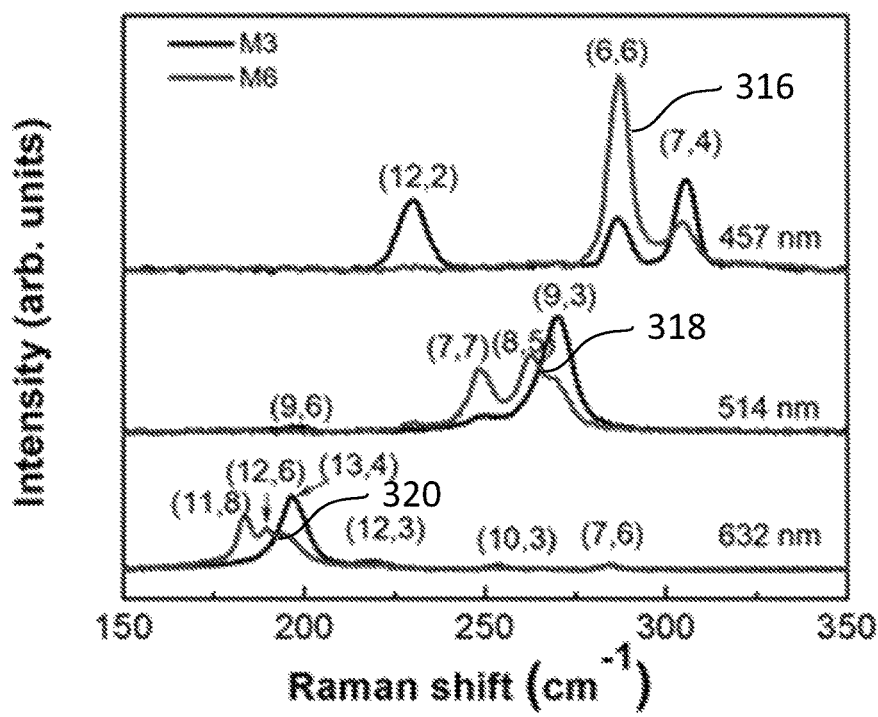
FIG. 3B shows Raman breathing mode (RBM) profiles of $M_3$ and $M_6$.

As shown in FIG. 3B, metallic RBM peaks from $M_6$ have higher peak intensities at lower Raman shifts. Plots 316, 318, and 320 are the RMB peaks for $M_6$. The peaks at (6,6) in plot 316 and (7,7) in plot 318 are the assigned nanotube chirality, indicating that these are armchair nanotubes with zero bandgap. Chirality assignment further reveals that $M_6$ has more RBM peak intensities from armchair or near-armchair tubes. This implies that $M_3$ is enriched in smaller diameter and non-armchair metallic tubes with higher cos $(3\theta)/d^2$ values, whereas $M_6$ is enriched in armchair or near-armchair and larger diameter tubes with lower $\cos(3\theta)/d^2$ values. Taken together, the oxidative extraction process disclosed herein purifies SWCNTs in the order of large bandgap semiconducting tubes, small bandgap semiconducting tubes, semi-metals of non-zero bangap, and armchair tubes of zero-bandgap.

The oxidative extraction method disclosed herein has several features. First, it is capable of fractionating metallic tubes by their vanishingly small bandgap (i.e., sort the metallic tubes as a function of their very small bandgaps), a feat that no other nanotube separation method has ever demonstrated. Second, the oxidative extraction order for semiconducting tubes is opposite to that of the recently developed surfactant SDS/sodium deoxycholate (SDC)-based extraction, where a gradual increase (decrease) of the SDS (SDC) concentration leads to PEG phase extraction of larger diameter tubes first, followed by smaller diameter ones. The two different mechanisms may be jointly employed (e.g., sequentially, or in some other selected order) to achieve better separation. Finally, in comparison with SDS/SC based extraction process for metal/semiconductor separation, the oxidative extraction works with a greatly expanded surfactant concentration range (0.4% to 1% for SC, 0.4 to 1% for SDS) and temperature range (15° C.-30° C.), making the process much more reliable and robust.

In light of the newly identified role played by redox, and without being bound to specific theories, the SDS/SC based extraction of metal/semiconductor SWCNTs may have been enabled by dissolved oxygen, the oxidation potential of which is sensitively dependent on factors such as temperature and pH. In contrast, the methods disclosed herein are less vulnerable to uncontrollable external changes.

Without being bound to specific theories, the change in how nanotubes having different bandgaps preferentially enter one of the two phases in the ATP system (i.e., nanotube partitioning) when a redox chemical agent is added is most likely the result of the reorganization of surfactant coating layer surrounding the nanotubes, for example, as schematically shown by the surfactant molecules 108 and 110 in FIG. 1A. In other words, the addition of a chemical agent (e.g., a reductant or an oxidant) causes electron transfer between the nanotube and the chemical agent. For example, an oxidant can remove one or more electrons from a carbon nanotube, causing a change in the oxidation state of the carbon nanotube and influencing how the surfactant coating layer surrounding the nanotube is organized. The reorganization of the surfactant coating layer causes changes in the interaction of the carbon nanotube with solvent media. Oxidized carbon nanotubes can thus have a certain distribution across the two phases of the ATP system (i.e., the partition).

Conversely, a reductant can add one or more electrons to a carbon nanotube, causing a change in the oxidation state of the carbon nanotube and influencing how the surfactant coating layer surrounding the reduced nanotube is organized. The reorganization of the surfactant coating layer due to the reduction of the nanotube influences the interaction of the carbon nanotube with solvent media, and the reduced carbon nanotube can thus have another distribution across the two phases of the ATP system (i.e., another partition).

Oxidation/reduction can alter the electronic configuration or electron wave function of a nanotube, which in turn can alter the bonding between the nanotube and surfactant molecules. To accommodate changes in binding affinity between the SWCNT and the surfactant molecules as a result of the redox processes, the surfactant layer reorganizes in composition and/or spatial arrangement, leading to a change in the solvation energies in the two phases due to changes in the surfactant layer.

The above analysis suggests that the redox effect should be a general phenomenon observable in other SWCNT separation processes. It is likely that a number of reported pH- and oxygen-dependent separation phenomena in density gradient ultracentrifugation (DGU) and gel chromatography are also due to redox-triggered surfactant reorganization, as shown by the direct observation of the redox effect on DGU and gel chromatography separations described below.

Figure 5C:
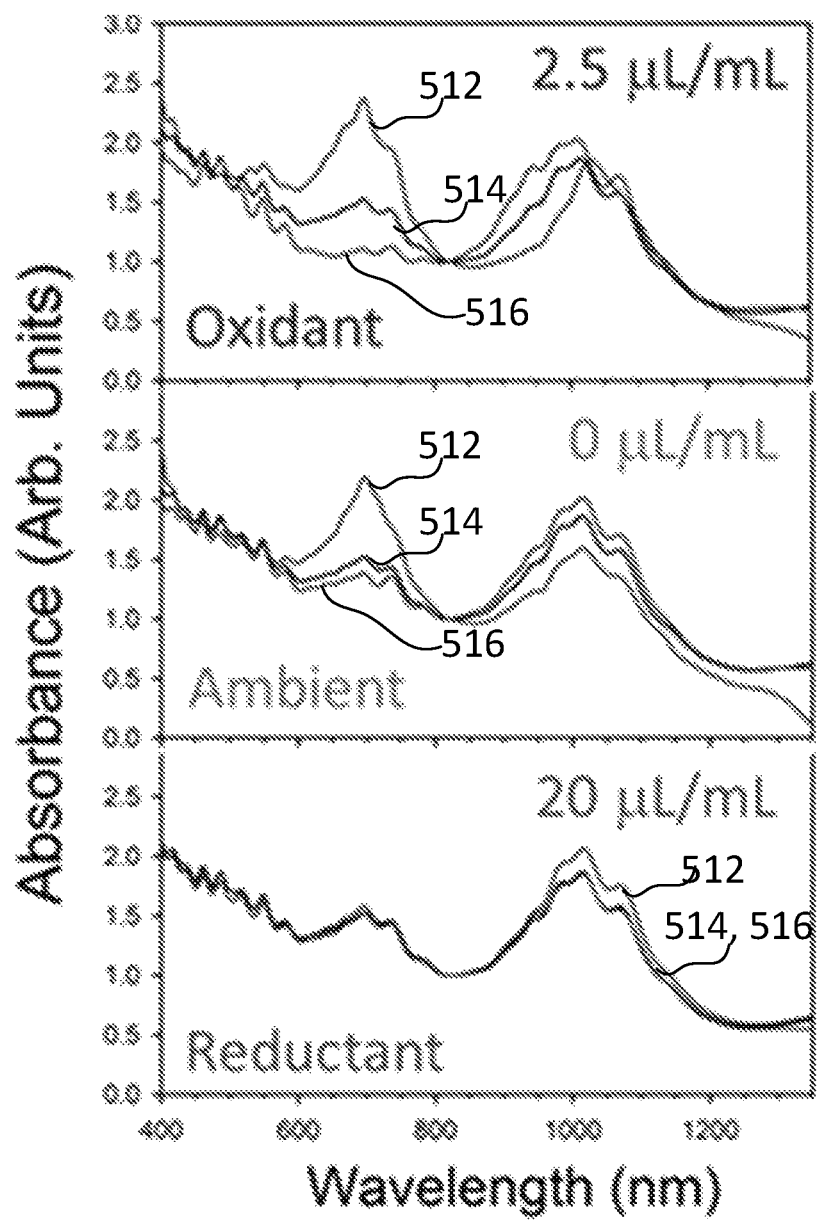
FIG. 5C shows spectra of aliquots collected.

The results in FIGS. 5A-5C for DGU show that the buoyancy of SWCNTs, or changes in the density of SWCNT fractions are strongly modulated by the redox potential.

FIG. 6A-6F show results from the case of gel chromatography. As will be explained in detail below, observed elution pattern of semiconducting tubes is also dependent on redox conditions. This implies that the binding affinity to the stationary phase polymer matrix can be changed by surfactant reorganization, which is in turn caused by the redox reactions.

Density Gradient Ultracentrifugation (DGU)

A density gradient containing water-filled electric arc nanotubes was prepared and run in a preparative ultracentrifuge (Optima™ L80-XP from Beckman Coulter of Brea, Calif.) to demonstrate the change in SWCNT density with the solution redox condition. Eight, three-layer gradients that includes a top layer having 3.7 mL (26% (volume/volume) iodixanol, 1.125% SC, 1.125% SDS), a 0.7 mL middle layer (30% iodixanol, 1.125% SC, 1.125 SDS) containing the dispersed SWCNTs, and a 0.5 mL bottom layer (34% iodixanol, 1.125% SC, 1.125 SDS) were constructed in Beckman optiseal ½" centrifuge tubes (#362185). These solution conditions have been found to mimic conditions that previously led to good metallic/semiconducting separation during DGU.

In the embodiments shown in FIGS. 5A-5C, prior to constructing the gradients in the centrifuge tube, an amount of either the oxidant (e.g., 100× diluted stock NaClO), or the reducing agent, (e.g., 1 M DTT), was added to both the top and middle layers for each specific centrifuge tube to generate a range of solution redox conditions, including a no additive (i.e., ambient) condition. FIG. 5A shows a photograph of a tube 502 prior to DGU. The amount of modifier (i.e., oxidant or reductant) added is shown in FIG. 5B. The tubes were then ultracentrifuged using VTi 65.2 rotor from Berkman Coulter of Brea, Calif. at 6810 rad/s (65 kRPM) for 1 h at 20° C. FIG. 5B is a photograph of the results. The addition of the oxidant in tubes 504 and 506 dramatically changes the average density of the SWCNTs. In contrast, the change with addition of the reducing agent in a tube 510 is less dramatic even though the color at the top of the main SWCNT band changes from blue-gray to bronze with the addition of the reducing agent. The best separation of metallic and semi-conducting tubes was achieved for addition of 0.125 mM (2.5 µL/mL) of the oxidant. Ambient conditions achieved the second best separation results.

Absorption spectra of aliquots collected from three of the tubes (i.e., tubes 506, 508 and 510) are shown in FIG. 5C. Absorbance spectra 512, 514, and 516 are normalized to one at 810 nm to aid comparison. A top 512 band and a bottom band 516 for the tubes 506 and 508 show clear metal-semiconducting separation. The location of the aliquots is given by the bars labeled as 512 and 516 corresponding to absorption spectra trace reference numbers (i.e., 512 and 516), the pre-separation spectrum has the reference number 514. The approximate positions of the extracted bands 512 and 516 in each of the tubes 506, 508 and 510 are shown for each fraction in the corresponding absorption spectra in FIG. 5C. Plots 514 show the absorption spectra of the parent dispersion. The separation of metallic SWCNTs from the semiconducting SWCNTs is improved from the ambient condition by addition of the small amount of oxidant NaClO (0.125 mM or 2.5 µL/mL). Addition of 20 mM reductant DTT reverses the nature of the SWCNTs isolated at the top of the band.

Gel Chromatography Separation

In an embodiment, 0.2 mL HiPco (obtained from Unidym Inc., of Sunnyvale, Calif.) SWCNTs dispersion is loaded onto a column. Nanotubes are found to stay in the top of the gel column. A solution of 1% SDS is used to elute nanotubes. The elution is collected at 0.15 mL per fraction.

HiPco dispersion is treated under three different conditions before loading onto the gel column to study the redox effect:
50 mM DTT added to the HiPco dispersion,
nothing added to the HiPco dispersion, and
50 mM NaClO added to the HiPco dispersion.

Figure 6A:
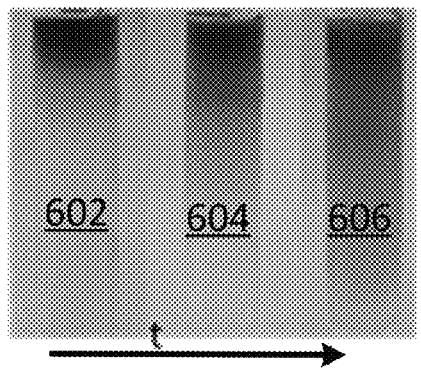
FIG. 6A shows chromatography elution pattern for dithiothreitol (DTT)-treated HiPco tubes.
Figure 6D:
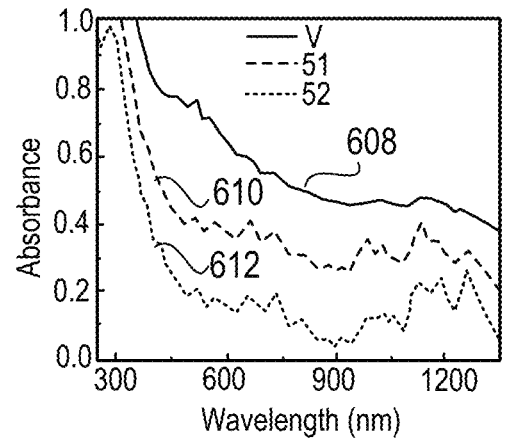
FIG. 6D shows absorption spectra of the tubes shown in FIG. 6A.

The separation outcome of DTT treated HiPco dispersion is shown in FIG. 6A. Images 602, 604, and 606 are taken at the early, middle and late stages of the elution process. When washed by 1% SDS, a red band comes down first, and then a blue band is mixed with the red band. The remaining black materials stuck on the column is most likely amorphous impurities. Absorption spectra of a few fractions are shown in FIG. 6D. The measurement shows that the earlier red fraction is metallic enriched (trace 608), whereas the later blue to brown fraction are semiconducting enriched. One early S-SWCNT fraction (trace 610) and one late S-SWCNT fractions (trace 612) reveal that the elution order is small-diameter S-SWCNTs first and large-diameter S-SWCNTs second.

Figure 6B:
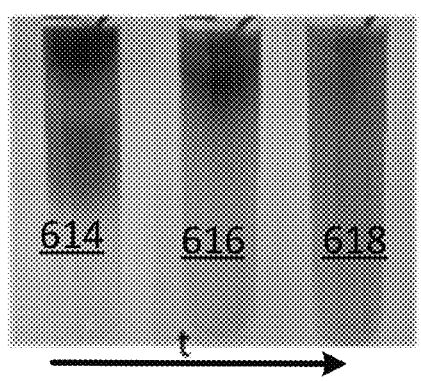
FIG. 6B shows chromatography elution pattern for non-treated HiPco tubes.
Figure 6E:
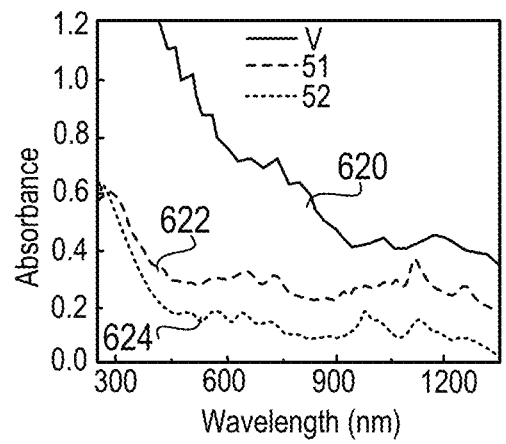
FIG. 6E shows absorption spectra of the tubes shown in FIG. 6B.

The non-treated HiPco dispersion has different elution pattern as shown in FIGS. 6B and 6E. Images 614, 616, and 618 are taken at the early, middle and late stages of the elution process. In this case the early metallic fractions (trace 620) contain substantial amount of semiconducting tube contaminant. For the later semiconductor enriched fractions (traces 622 and 624), larger-diameter tubes are eluted first followed by small-diameter tubes.

Figure 6C:
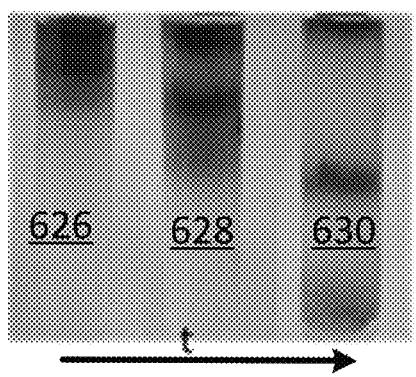
FIG. 6C shows chromatography elution pattern for NaClO-treated HiPco tubes.
Figure 6F:
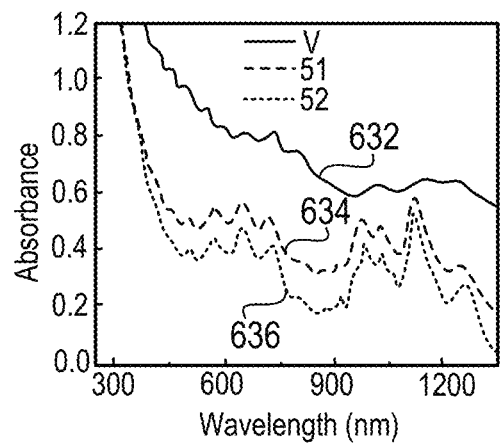
FIG. 6F shows absorption spectra of the tubes shown in FIG. 6C.

FIGS. 6C and 6F show the elution pattern for the 50 mM NaClO treated HiPco dispersion. Images 626, 628, and 630 are taken at the early, middle and late stages of the elution process. In this case, two well separated bands are developed. The earlier band is enriched in metallic tubes (as shown in trace 634 and 636) but have substantial semiconducting tube contaminant. The later band is mostly semiconducting tubes (shown by trace 632) with little diameter separation.

Figure 7B:
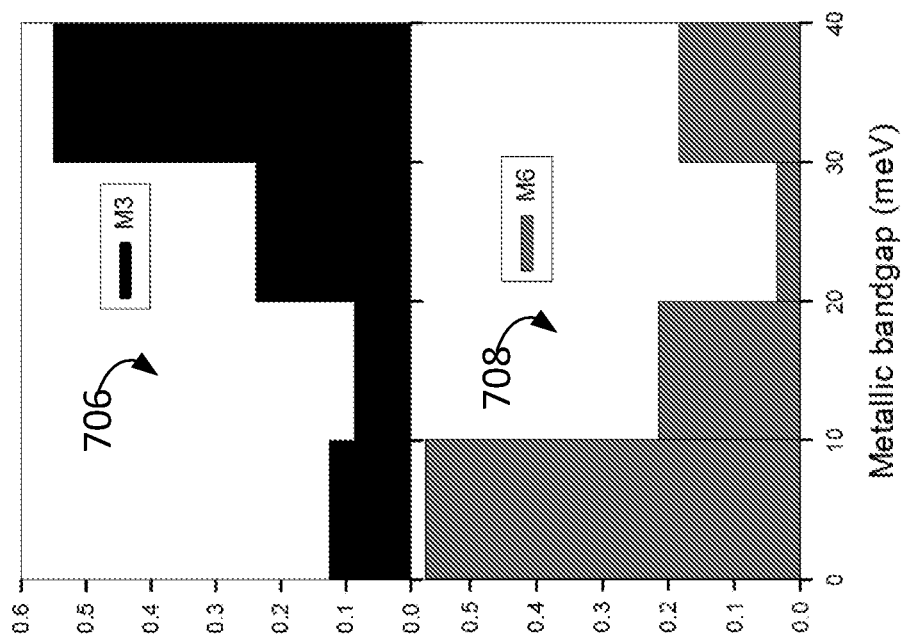
FIG. 7B shows bandgap distribution of extracted metallic SWCNTs.
Figure 7A:
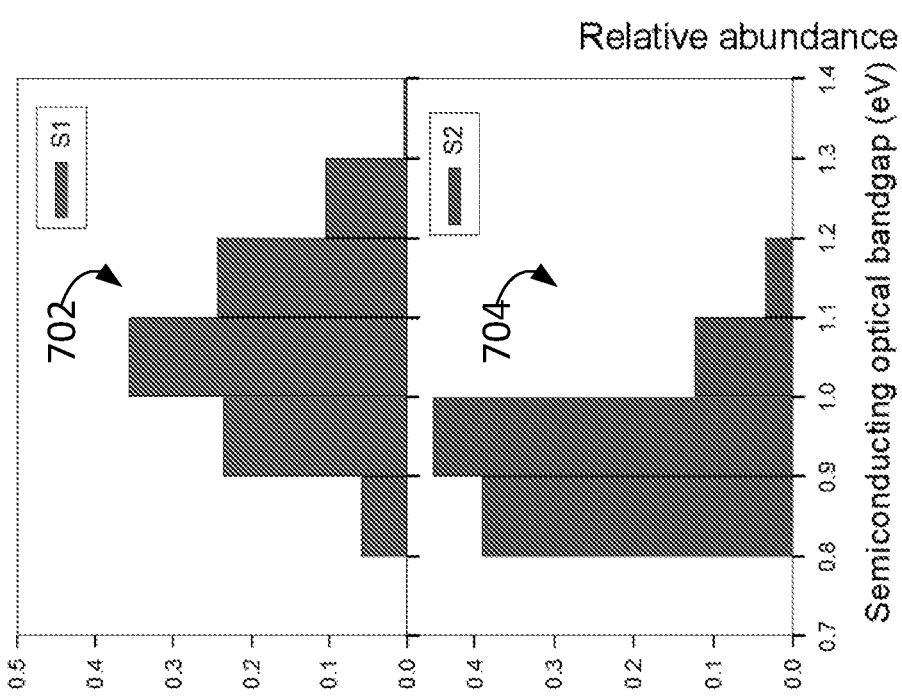
FIG. 7A shows bandgap distributions of extracted semiconducting SWCNTs.

FIG. 7A shows bar graph 702 which displays the relative abundance of SWCNTs contained within the S1 fraction (or component 210 shown in FIG. 2A) as a function of their bandgap. The absorption spectrum 252 of the component 210 is shown in FIG. 2B. Bar graph 704 displays the relative abundance of SWCNTs contained within the S2 fraction (or component 212) as a function of their bandgap. FIG. 7A shows that smaller diameter (larger bandgap) SWCNTs are first extracted in S1 followed by larger diameter (smaller bandgap) SWCNTs in S2. FIG. 7B demonstrates that the oxidative extraction method disclosed herein is additionally able to fractionate metallic nanotubes by their vanishingly small bandgap, with fraction $M_3$ (whose absorption spectrum is shown in FIG. 3A as trace 302) enriched in larger non-zero bandgap semi-metals and fraction $M_6$ (whose absorption spectrum is shown in FIG. 3A as trace 308) enriched in zero-bandgap armchair metals.

FIG. 4 show the absorption spectra of a control dispersion (shown by plot 404), a dispersion that includes vitamin E, and a dispersion that is water treated. For the control dispersion, poly[(9,9-dioctylfluorenyl-2,7-diyl)-alt-co-(6,6'-{2,2'-bipyridine})] (PFO-bipy) at 1 mg/mL and HiPco material at 0.036 mg/mL are mixed with 1 mL toluene in a 1.5 mL Eppendorf tube. The mixture is sonicated for 20 minutes at 8 W power output using a 2 mm diameter probe. The resulting suspension is centrifuged at 18° C. and 17,000 g for 5 minutes. The supernatant can be taken as the control dispersion.

For the vitamin E added dispersion (shown by spectrum 402), the above procedure is followed except that 10 mM vitamin E is included in the sonication mixture.

For the water treated dispersion (shown by spectrum 406), 100 µL of the control dispersion is mixed with 10 uL of water and bath sonicated for 5 minutes. Centrifuge the resulting emulsion and take out the top clear phase to yield the water treated dispersion.

Redox reactions also affect SWCNT dispersion in organic solvents, further extending the role of redox reactions in SWCNT separation. Polyfluorene and related polymer structures can efficiently extract semiconducting tubes in non-polar solvents. A few commercially available polyfluorene derivatives for the dispersion of various sources of SWCNTs show that oxidizing conditions enhance selective dispersion with a concomitant lowering of dispersion yield, whereas reducing condition may do the opposite. FIG. 4 shows an example of the redox effect on the dispersion of HiPco nanotubes by poly[(9,9-dioctylfluorenyl-2,7-diyl)-alt-co-(6, 6'-{2,2'-bipyridine})] (PFO-bipy). A PFO-bipy/SWCNT mass ratio of 28 is shown in this embodiment. Selective dispersion of semiconducting tubes can be compromised by an excess amount of PFO-bipy, as evident by the appearance of metallic SWCNT features in the 400 to 600 nm region (grey area in FIG. 4) of the absorption spectrum as shown by trace 404.

A mild oxidation treatment via the addition of 1/10 the sample volume of water followed by bath sonication induces preferential metallic tube aggregation, such that the remaining dispersion shown by trace 406 is highly enriched in semiconducting tubes. Bath sonication and centrifugation are used to remove the newly formed aggregates.

In contrast, in the presence of 10 mM reducing agent vitamin E, PFO-bipy disperses nearly all chiral species non-selectively, as shown by trace 402. The non-selectivity can be seen, for example, from the similarity in the absorption spectra between the trace 402 and the trace 404. In contrast, the trace 406 which shows the water treated sample does not contain the absorption peaks between 400-600 nm that are present in traces 402 and 404. These absorption peaks correspond to metallic SWCNTs. Their absence from trace 406 shows that semi-conducting SWCNTs have been selectively dispersed in the water treated sample.

The solubility of polymer-wrapped SWCNTs in organic solvents can thus strongly depend on the redox status of the solvent environment. Ambient redox condition can enable certain polymers to selectively extract semiconducting tubes under a narrow polymer/SWCNT mass ratio. For example, controlled oxidation may be used to enhance the selectivity of semiconducting tube for those polymers that may lack such selectivity under ambient conditions.

Redox can strongly affect the structure of the surfactant coating layer, and consequently, the outcome of nanotubes separation. Ambient redox conditions set by the dissolved oxygen and uncontrolled pH (in aqueous systems) can be conducive to a number of SWCNT separation processes. Regulating redox reactions can offer a valuable parameter for obtaining more reproducible separation outcomes. Redox tuning of coating layer structures can also be used to enhance separation resolution. In addition to nanotubes separation, redox triggered surfactant reorganization may also affect other colloidal behavior of SWCNTs.

Materials and Methods

Hanwha (HW) SWCNTs are purchased from Hanwha Chemical, of Seoul, Korea. Raymor SWCNTs are purchased from Raymor Nanotech (lot number: RNL 13-020-016) of Québec, Canada. Two sources of HiPco are used, one from Rice University (batch number: 195.3) of Houston, Tex., and the other from Unidym of Sunnyvale, Calif. Polyethylene glycol (PEG, 6 KDa, Alfa Aesar of Haverhill, Mass.), dextran (DX, 70 KDa, TCI of Portand, Oreg.), sodium deoxycholate (SDC, Sigma-Aldrich of St. Louis, Mo.), sodium cholate (SC, Sigma-Aldrich), sodium dodecyl sulfate (SDS, Sigma-Aldrich), NaClO (Sigma-Aldrich), dithiothreitol (DTT, Sigma-Aldrich), $NaBH_4$ (Sigma-Aldrich), $KMnO_4$ (Sigma-Aldrich), $K_2IrCl_6$ (Sigma-Aldrich) and vitamin E ((Sigma-Aldrich) are used as received.

All the ATP processes can be done at ~20° C.

Gel column preparation: Deionized (DI) water was used to wash Sephacryl S 100 gel (GE Healthcare, of Little Chalfont, United Kingdom) for 3 times to remove ethanol in the gel slurry. Then, the washed gel is loaded to a 1 cm-diameter 3 mL syringe column that has a piece of cotton at the bottom as a filter. The height of the gel column after settling can be 2.5 cm. The column is equilibrated by 1% SDS before SWCNT dispersion is loaded for separation.

Optical absorption characterization: Varian Cary 5000 spectrophotometer of Palo Alto, Calif., can be used to measure the UV-vis-NIR absorption of the nanotubes. When the wavelength is shorter than 1400 nm, a quartz microcuvette with 10 mm path length was used. For wavelength beyond 1400 nm, a 2 mm path length cuvette is used. Blank ATP phases without SWCNT are used as the background when measuring the ATP top or bottom phase samples.

NaClO is an inexpensive but effective oxidant; $K_2IrCl_6$, is a strong one-electron oxidant suitable for investigating SWCNT redox chemistry; and $KMnO_4$, is a commonly used strong oxidant.

Reductants such as DTT can enhance fluorescence quantum yield of semiconducting SWCNTs. $NaBH_4$, is a very strong reductant that can be used in conjunction with benzyl viologen to create stable n-doped SWCNTs. Vitamin E can be a useful reductant in non-polar solvents.

A 1M $NaBH_4$ in water solution can freshly made for the redox reaction. $NaBH_4$ reacts with water and generates $H_2$ slowly. The concentration of $NaBH_4$ used does not account for that reaction and is assumed to be 1M. The oxidant NaClO as purchased is in liquid form and the Cl weight percentage is 10%-15%, corresponding to a NaClO concentration of 3-5 M. A nominal NaClO stock concentration of 5M for calculations is assumed.

A number of embodiments of the invention have been described. Nevertheless, it will be understood that various modifications may be made without departing from the spirit and scope of the invention. Accordingly, other embodiments are within the scope of the following claims.

What is claimed is:

1. A method of separating and extracting carbon nanotubes, the method comprising:
   introducing the carbon nanotubes into a two-phase system comprising a first component and a second component, the first component being different from the second component;
   introducing a chemical agent into the two-phase system, wherein the chemical agent comprises an oxidant or a reductant;
   mixing the chemical agent and the carbon nanotubes in the two-phase system;
   settling the two-phase system;
   removing the first component to extract a first portion of the carbon nanotubes contained in the first component after the mixing;
   replenishing the two-phase system with fresh first component;
   mixing the carbon nanotubes in the two-phase system having the fresh first component;
   settling the two-phase system; and
   removing the fresh first component to extract a second portion of the carbon nanotubes contained in the fresh first component,
   wherein a bandgap of the carbon nanotubes in the first portion is different from the bandgap of the carbon nanotubes in the second portion.

2. The method of claim 1, wherein the chemical agent comprises an oxidant, the first component comprises polyethylene glycol (PEG), the second component comprises dextran, and the bandgap of the carbon nanotubes in the first portion is larger than the bandgap of the carbon nanotubes in the second portion.

3. The method of claim 2, wherein the two-phase system comprises 6% PEG and 6% dextran.

4. The method of claim 3, wherein the oxidant comprises NaClO.

5. The method of claim 1, further comprising:
introducing surfactants to the first component and the second component, wherein the chemical agent causes electrons to transfer between the carbon nanotubes and the chemical agent;
reorganizing a surfactant coating layer surrounding the carbon nanotubes; and
altering a partition of the carbon nanotubes in the two-phase system.

6. The method of claim 5, wherein the surfactants comprise sodium cholate and sodium dodecyl sulfate.

7. The method of claim 6, wherein a concentration of the sodium cholate is between 0.4% to 1%, and a concentration of the sodium dodecyl sulfate is 0.4% to 1%.

8. The method of claim 1, wherein the method is carried out at temperatures between 15° C. to 30° C.

9. The method of claim 1, wherein the carbon nanotubes in the first portion comprise metallic tubes having a bandgap smaller than 100 meV, and the carbon nanotubes in the second portion comprise metallic tubes having a bandgap smaller than that of the carbon nanotubes in the first portion.

10. The method of claim 1, wherein the carbon nanotubes in the first portion comprise semiconducting nanotubes having a first bandgap, and the carbon nanotubes in the second portion comprise semiconducting tubes having a bandgap smaller than the first bandgap.

11. The method of claim 1, further comprising:
after extracting the second portion, replenishing the two-phase system with fresh first component;
adding the chemical agent into the two-phase system;
mixing the chemical agent and the carbon nanotubes in the two-phase system;
settling the two-phase system;
removing the first component of the two-phase system to extract a third portion of carbon nanotubes contained in the first component;
replenishing the two-phase system with fresh first component;
mixing the carbon nanotubes in the two-phase system having the fresh first component;
settling the two-phase system;
removing the first component of the two-phase system to extract a fourth portion of carbon nanotubes contained in the first component of the two-phase system;
wherein the carbon nanotubes in the first portion comprise semiconducting nanotubes having a first bandgap, the carbon nanotubes in the second portion comprise semiconducting tubes having a bandgap smaller than the first bandgap, the carbon nanotubes in the third portion comprise metallic tubes having a bandgap smaller than 100 meV, and the carbon nanotubes in the fourth portion comprise metallic tubes having a bandgap smaller than that of the carbon nanotubes in the third portion.

12. The method of claim 1, wherein the chemical agent comprises a reductant, the first component comprises polyethylene glycol (PEG), the second component comprises dextran, and introducing the reductant causes semiconducting carbon nanotubes to be enriched in the dextran.

13. The method of claim 12, wherein the reductant comprises $NaBH_4$.

14. The method of claim 1, wherein the carbon nanotubes comprise arc-discharge single-wall carbon nanotubes.

15. The method of claim 1, wherein the first component is a top component of the two-phase system and the second component is a bottom component of the two-phase system.

16. The method of claim 1, wherein the first component is a bottom component of the two-phase system and the second component is a top component of the two-phase system.

17. A method of separating carbon nanotubes having different bandgaps, the method comprising:
introducing the carbon nanotubes to a two-phase system, the two-phase system comprising a first component and a second component, the first component being different from the second component; and
chemically altering an electronic configuration of the carbon nanotubes by treatment with an oxidant or a reductant to alter bonding between the carbon nanotubes and surfactant molecules surrounding the carbon nanotubes,
wherein the surfactant molecules reorganize in composition and/or spatial arrangement, causing changes in solvation energies of the carbon nanotubes in the first component and the second component as a function of bandgap.

18. The method of claim 17, wherein the first component of the two-phase system comprises a stationary phase polymer matrix and the second component comprises an eluent.

19. The method of claim 18, wherein chemically altering the electronic configuration comprises introducing an oxidant, and the reorganization of the surfactant molecules changes a binding affinity of the carbon nanotubes to the stationary phase polymer matrix.

20. The method of claim 19, wherein the eluent comprises 1% sodium dodecyl sulfate, the oxidant comprises NaClO, and carbon nanotubes collected in an earlier portion of the eluent comprise metallic carbon nanotubes, and carbon nanotubes collected in a later portion of the eluent comprise semiconducting carbon nanotubes.

21. The method of claim 17, wherein the first component of the two-phase system has a first density and the second component has a second density different from the first density, and chemically altering the electronic configuration of the carbon nanotubes comprises modulating a buoyancy of the carbon nanotubes as a function of bandgap.

22. The method of claim 17, wherein chemically altering an electronic configuration comprises introducing an oxidant, and the oxidant is configured to change an average density of the carbon nanotubes.

* * * * *